(12) United States Patent
Jäger et al.

(10) Patent No.: US 11,697,448 B2
(45) Date of Patent: Jul. 11, 2023

(54) LENGTH-ADJUSTABLE STEERING SHAFT FOR A MOTOR VEHICLE, AND PROFILED SLEEVE FOR A STEERING SHAFT

(71) Applicants: thyssenkrupp Presta AG, Eschen (LI); thyssenkrupp AG, Essen (DE)

(72) Inventors: Bernhard Jäger, Wangen im Allgäu (DE); Michael Bugl, Feldkirch (AT); Jochen Klekler, Senwald (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 15 days.

(21) Appl. No.: 17/605,887

(22) PCT Filed: Apr. 22, 2020

(86) PCT No.: PCT/EP2020/061163
§ 371 (c)(1),
(2) Date: Oct. 22, 2021

(87) PCT Pub. No.: WO2020/216771
PCT Pub. Date: Oct. 29, 2020

(65) Prior Publication Data
US 2022/0144332 A1  May 12, 2022

(30) Foreign Application Priority Data
Apr. 23, 2019 (DE) ............... 10 2019 205 784.5

(51) Int. Cl.
*B62D 1/185* (2006.01)
*B29C 45/26* (2006.01)
(Continued)

(52) U.S. Cl.
CPC ............ *B62D 1/185* (2013.01); *B29C 45/261* (2013.01); *B29C 45/2701* (2013.01);
(Continued)

(58) Field of Classification Search
CPC .................. B62D 1/185; F16D 3/06
See application file for complete search history.

(56) References Cited

U.S. PATENT DOCUMENTS 2,466,097 A * 4/1949 Graue ............ F16D 1/0876
464/158
6,145,406 A  11/2000 Baumann
(Continued)

FOREIGN PATENT DOCUMENTS

CN    1227175 A    9/1999
CN  108698276 A   10/2018
(Continued)

OTHER PUBLICATIONS

English Translation of International Search Report issued in PCT/EP2020/061163 dated Jun. 25, 2020.

*Primary Examiner* — Drew J Brown
(74) *Attorney, Agent, or Firm* — thyssenkrupp North America, LLC

(57) ABSTRACT

A length-adjustable steering shaft for a motor vehicle may include a hollow outer shaft with an unround inner cross section, in which an inner shaft is received in a torque-locked and axially movable manner. A profiled sleeve may be arranged between the inner shaft and the outer shaft, and the profiled sleeve may have a fastening portion connected to the inner shaft. The inner shaft may be configured at least in part as a hollow shaft that has an interior that is open towards the end that is inserted into the outer shaft. To reduce the outlay in terms of production and assembly, the fastening portion may extend from the end into the interior of the inner shaft and is connected to an inner surface of the interior.

8 Claims, 4 Drawing Sheets

(51) Int. Cl.
*B29C 45/27* (2006.01)
*F16C 3/035* (2006.01)
*F16C 29/02* (2006.01)
*F16C 33/20* (2006.01)
*F16D 3/06* (2006.01)
*B29L 23/00* (2006.01)

(52) U.S. Cl.
CPC ............. *F16C 3/035* (2013.01); *F16C 29/02* (2013.01); *F16C 33/208* (2013.01); *F16D 3/06* (2013.01); *B29L 2023/22* (2013.01); *F16C 2220/04* (2013.01); *F16D 2300/12* (2013.01)

(56) References Cited

U.S. PATENT DOCUMENTS

| | | | |
|---|---|---|---|
| 11,472,467 B2 * | 10/2022 | Durot | ............... F16D 3/06 |
| 2003/0073502 A1 | 4/2003 | Barnley et al. | |
| 2007/0039403 A1 | 2/2007 | Manwaring et al. | |
| 2010/0307280 A1 | 12/2010 | Schnitzer | |
| 2013/0228034 A1 * | 9/2013 | Hebenstreit | ............ B62D 1/185 |
| | | | 74/493 |
| 2015/0110551 A1 * | 4/2015 | Aoki | ......................... F16D 1/02 |
| | | | 403/359.1 |
| 2017/0356487 A1 * | 12/2017 | Müntener | ............... F16C 29/04 |
| 2019/0031226 A1 | 1/2019 | Breuer et al. | |
| 2019/0047607 A1 | 2/2019 | Szostak et al. | |
| 2019/0092370 A1 | 3/2019 | Breuer et al. | |
| 2019/0101213 A1 | 4/2019 | Walser | |
| 2019/0176871 A1 | 6/2019 | Breuer et al. | |

FOREIGN PATENT DOCUMENTS

| | | | | |
|---|---|---|---|---|
| CN | 109153401 A | | 1/2019 | |
| CN | 109642603 A | | 4/2019 | |
| CN | 114633794 A | * | 6/2022 | ............ B62D 1/185 |
| DE | 10 2014 115 804 A1 | | 5/2016 | |
| DE | 10 2016 203 625 B3 | | 3/2017 | |
| DE | 10 2017 201 709 A1 | | 8/2018 | |
| DE | 10 2018 119 155 A1 | | 2/2019 | |
| ES | 2381826 A1 | | 6/2012 | |
| GB | 2455619 A | * | 6/2009 | ............ B62D 1/185 |
| JP | 2013-141957 A | | 7/2013 | |
| WO | 2015144483 A1 | | 10/2015 | |
| WO | 2016/066291 A1 | | 5/2016 | |
| WO | WO-2018029289 A1 | * | 2/2018 | ............... B62D 1/16 |
| WO | 2019002298 A1 | | 1/2019 | |

\* cited by examiner

LENGTH-ADJUSTABLE STEERING SHAFT FOR A MOTOR VEHICLE, AND PROFILED SLEEVE FOR A STEERING SHAFT

CROSS REFERENCE TO RELATED APPLICATIONS

This application is a U.S. National Stage Entry of International Patent Application Serial Number PCT/EP2020/061163, filed Apr. 22, 2020, which claims priority to German Patent Application No. DE 10 2019 205 784.5, filed Apr. 23, 2019, the entire contents of both of which are incorporated herein by reference.

FIELD

The present disclosure generally relates to steering shafts, including steering shafts with hollow outer shafts and inner shafts that are received in the hollow outer shafts.

BACKGROUND

In order to allow the steering column in a motor vehicle to be adjusted relative to the driver's position, telescopic steering shafts are known, in which at least one shaft portion is configured so as to be length-adjustable, for length adjustment in the length or axial direction. In a motor vehicle steering system, a length-adjustable steering shaft can form the steering spindle on the driver's side or the intermediate steering shaft between the steering spindle and the steering gear.

A steering shaft according to the preamble, which is described, for example, in DE 10 2017 201 709 A1, has an outer shaft configured as a hollow shaft, into which an inner shaft is inserted so as to be axially displaceable in a telescopic manner. For torque transmission, the inner shaft has a transmission portion with an unround cross-sectional profile, for example a toothing portion with axially extended teeth, which engages in a torque-locked manner into a corresponding inner profile, for example a corresponding internal toothing of the outer shaft. The inner shaft can likewise be configured in tube form as a hollow shaft at least in part, preferably in the region of the transmission portion, wherein the interior has an end-face opening at the end that is inserted into the outer shaft.

In order to reduce the friction during the axial adjustment and in order to reduce the angular clearance between the outer and inner shaft, which are in most cases manufactured from steel, it is known from the prior art to use a sliding sleeve which is arranged in the form of a profiled sleeve at least in part in the region of the torque-transmitting transmission cross section between the inner and outer shaft. The profiled sleeve is manufactured from or coated with a material that is readily slidable on steel, preferably a plastics material such as polypropylene (PP), polytetrafluoroethylene (PTFE) or the like, and encloses the transmission portion at least in part, and extends, for example, axially over a portion of the toothing portion. Manufacture can take place as a plastics injection molded part which is fixed to the inner shaft so that it in particular cannot be removed from the free end of the inner shaft.

For axial fixing, the profiled sleeve has a fastening portion which is connected to the inner shaft. For connection, it is proposed in the mentioned DE 10 2017 201 709 A1 that at least one fastening element is arranged externally on the inner shaft, which fastening element is connected to a fastening portion surrounding the inner shaft externally. For example, there can be provided a projection which protrudes outwardly from the inner shaft and holds or axially supports the profiled sleeve in a form-fitting manner, or a depression introduced into the inner shaft from the outside, into which depression the fastening portion engages.

In order to permit smooth axial adjustment and at the same time ensure that, where possible, no angular clearance occurs, narrow tolerances must be observed in the manufacture and assembly of the profiled sleeve. However, because the fastening portion in the known connections is located externally on the inner shaft and thus between, or within, the functional surfaces of the inner and outer shaft that serve for torque transmission, even slight deformations or tolerances on fixing of the profiled sleeve can influence the friction, so that, for example, a disadvantageously high displacement force can occur on adjustment. This results in a relatively high outlay as regards dimensionally accurate and precise manufacture and fixing of the profiled sleeve.

Thus a need exists to reduce the outlay in terms of production and assembly.

DETAILED DESCRIPTION

Figure 1:
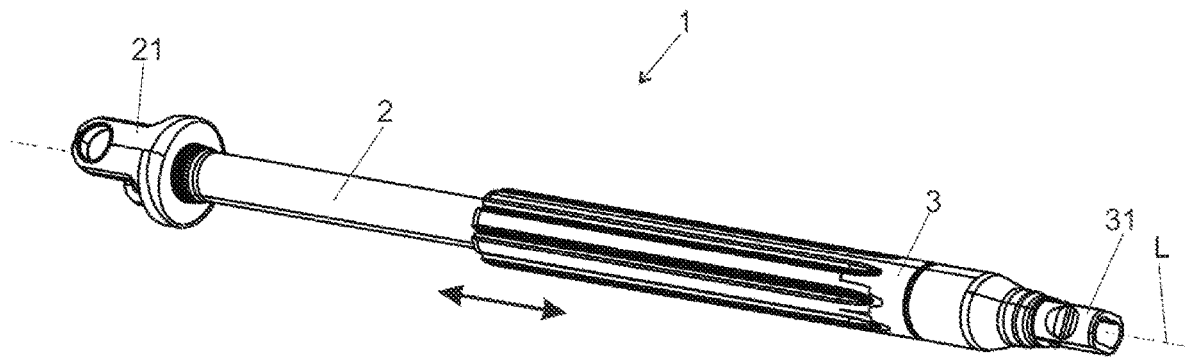
FIG. 1 is a schematic perspective view of an example steering shaft.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a length-adjustable steering shaft for a motor vehicle, comprising a hollow outer shaft with an unround inner cross section, in which an inner shaft is received in a torque-locked and axially movable manner. A profiled sleeve is arranged between the inner shaft and the outer shaft, which profiled sleeve has a fastening portion connected to the inner shaft. The inner shaft is configured at least in part as a hollow shaft which has an interior which is open towards the end that is inserted into the outer shaft.

In a length-adjustable steering shaft for a motor vehicle, comprising a hollow outer shaft with an unround inner cross section, in which an inner shaft is received in a torque-locked and axially movable manner, wherein a profiled sleeve is arranged between the inner shaft and the outer shaft, which profiled sleeve has a fastening portion connected to the inner shaft, and the inner shaft is configured at least in part as a hollow shaft which has an interior which is open towards the end that is inserted into the outer shaft, it is provided according to the invention that the fastening portion extends from the end into the interior of the inner shaft and is connected to an inner surface of the interior.

An unround inner cross section is to be understood as meaning any shape that differs from a circular-cylindrical shape.

The fastening portion of the profiled sleeve is connected to the inner surface of the interior in such a manner that the profiled sleeve is fixed in a direction at least in the direction of the longitudinal axis of the inner shaft. A relative displacement of the profiled sleeve relative to the inner shaft in a direction of the longitudinal direction is thus prevented. The profiled sleeve can thus effectively be prevented from being brought into an undesirable relative position relative to the inner shaft, in other words unintentional separation of the profiled sleeve and the inner shaft is prevented.

In the invention, the fastening portion of the profiled sleeve is connected to the hollow inner shaft from the inside, that is to say in its interior, and not from the outside as in the prior art. As is known in the prior art, the profiled sleeve has a bearing region which encloses the inner shaft externally at least in part and which in the assembled state is arranged in the torque-transmitting portion between the inner and outer shaft and has the sliding bearing surfaces. The profiled sleeve further has a fastening portion which is connected to the bearing region but which is not, as in the prior art, connected externally, that is to say to the outer lateral surface or the end face of the inner shaft, but, according to the invention, is connected in the interior to an inner surface in the interior of the hollow inner shaft and is there fixed at least in the axial direction to the inner shaft.

Because the fastening portion is moved according to the invention into the interior of the inner shaft, no additional axial portion for fixing is required on the outside, and a greater length for the bearing region is accordingly available on the outside of the inner shaft. As a result, the profiled sleeve, while having the same length, can extend over a larger axial bearing region, preferably over the toothing, or the inner shaft can in itself be made shorter in order to permit deeper insertion into the outer shaft. As a result, when the steering shaft is axially pushed together in the event of a crash, the path provided for energy absorption can advantageously be increased without changing the bearing properties of the profiled sleeve. However, energy absorption in the steering shaft according to the invention is a facultative feature which is not essential for carrying out the teaching according to the invention.

The bearing region of the profiled sleeve according to the invention encloses the inner shaft at least in part from the outside in the region of the torque-transmitting, unround region, for example the toothing. At the end-face end, the profiled sleeve is connected to the fastening portion preferably via a connecting portion, which extends through the end-face opening back into the interior of the inner shaft, where it is connected according to the invention to the inner shaft from the inside. In other words, the profiled sleeve engages around the open end of the inner shaft in such a manner that the wall of the inner shaft, which is tubular in this portion, is arranged between the fastening portion located radially on the inside and the bearing portion located radially on the outside.

The bearing portion preferably has a cross section which corresponds to the cross section of the region of the inner shaft on which the bearing portion is arranged. The bearing portion is preferably tubular in form and has an unround cross-sectional profile. The bearing portion is preferably shorter than the inner shaft. The inner shaft is preferably tubular in form at least in part and has at its end that is inserted into the outer shaft an end-face opening to the interior. There is preferably located at the end the transmission portion, which can preferably be configured as a toothing portion. The profiled sleeve according to the invention can then extend externally on the inner shaft in one direction to the end of the toothing portion, where it is preferably connected via a connecting portion to a fastening portion, which is inserted into said end-face opening in the opposite direction and extends into the interior of the inner shaft. In other words, the profiled sleeve engages around the edge of the end-face opening and the fastening portion extends back into the open cross section of the profiled sleeve, such that, when attached to the inner shaft, the profiled sleeve surrounds the inner shaft externally in the region of the toothing portion and is inserted with its transmission portion through the end opening into the interior of the inner shaft.

For fixing the profiled sleeve, corresponding fastening means can be provided on the inner shaft and the profiled sleeve. The fastening means can be arranged on the fastening portion of the profiled sleeve and are connected to the inner wall within the inner shaft in the inner region into which the fastening portion is inserted. For this purpose, the inner wall preferably has corresponding connecting elements. The connecting elements can be configured to produce a form-fitting and/or force-fitting and or substance-to substance connection. It is advantageous thereby that the fastening means arranged on the inside with respect to the inner shaft are spatially and functionally separate from the bearing portion arranged on the outside and, regardless of their functionality, can be mechanically uncoupled from the bearing region of the profiled sleeve. A possible deformation of the fastening portion due to tolerances on manufacture and assembly, or also caused by operating conditions such as temperature fluctuations or the like, does not have a direct mechanical influence on the bearing portion. This results in the particular advantage that the connection of the inner shaft and the profiled sleeve no longer has a direct influence on the friction between the inner and outer shaft, since these two functions are spatially separate from one another. Consequently, greater tolerances are permissible without impairing the function, so that the outlay in terms of manufacturing and assembly can in turn be reduced.

The fastening portion can preferably have a radial outer surface which is connected to an inner surface which radially delimits the interior. The radial outer surface is located at an outer lateral surface of the fastening portion and is located, in the radial direction, opposite an inner lateral surface of the inner shaft. The radial outer surface and the inner surface can preferably have mutually corresponding connecting elements for forming a connection which is able to be loaded in the axial direction pointing out of the interior.

It can be provided that the fastening portion is tubular in form. The fastening portion can, for example, have a tube portion which is connected at the end face via at least one connecting portion to the bearing portion of the profiled sleeve surrounding the inner shaft externally. The tube portion can have a tube socket or alternatively can have a plurality of individual tube segments separated in the circumferential direction. The fastening portion extends from the open end back into the open cross section of the profiled sleeve, wherein an annular gap is formed therebetween, into which the end of the inner shaft can be introduced for assembly. The fastening portion is thereby inserted through the end-face opening axially into the interior, and the bearing portion surrounds an outer portion. The fastening portion of the profiled sleeve thus engages around the end-face end of the inner shaft in the manner of a collar.

The cross section of the fastening portion can be adapted to the inner cross section of the inner shaft, so that a rotationally fixed connection is produced on insertion, for example by an unround cross section or interengaging form-fitting elements which are effective in the circumferential direction.

It can be advantageous that mutually corresponding connecting elements which can be connected to one another are arranged on the inner surface and on the fastening portion. The inner shaft can have on the radial inner surface one or more connecting elements which come into connecting engagement with one or more corresponding counter-connecting elements on the fastening portion. These connecting elements are preferably arranged uniformly distributed in the circumferential direction.

It can be provided that there is formed on the inner shaft at least one form-fitting element which protrudes radially inwards from the inner surface into the interior and which can be brought into form-fitting engagement with a form-fitting receiver of the fastening portion. The form-fitting elements of the inner shaft can have at least one radially inwardly protruding projection which engages radially into a corresponding form-fitting receiver, which can be configured, for example, as a recess, depression or radial opening in the fastening portion, or as an undercut in the axial and/or radial direction. A form-fitting connection of the profiled sleeve to the inner shaft that is effective in the circumferential direction and in the axial direction can thus be produced, which connection acts as pull-out protection and prevents the fastening portion from being withdrawn from the opening of the inner shaft. Such a configuration can be produced with a low outlay, and a secure and durable connection can be achieved with a compact structural form.

In principle, a reverse arrangement is also possible, in which the fastening portion has a radially outwardly protruding form-fitting element which engages from the inside into a corresponding form-fitting receiver formed in the inside in the inner wall of the inner shaft.

An inwardly protruding projection can preferably be produced by cold forming of the inner wall of the interior. For example, this can be achieved by an axial caulking introduced from the opening, which can be manufactured economically and produces a radially inwardly protruding bulge of material. The caulking can engage radially, for example, into a corresponding form-fitting receiver in the fastening portion, for example an opening or aperture in a tube socket inserted into the inner shaft.

An advantageous embodiment of the invention can provide that the fastening portion is cup-shaped, with a cup base arranged in the interior axially spaced apart from the end face. When seen from the end face, the cup extends concavely into the interior, so that the cup base is arranged inside the bearing portion of the profiled sleeve at a distance from the end and in the assembled state is accordingly located in the interior of the inner shaft. By means of the cup base, which is wholly or at least partially closed and extends in the manner of a plate over the cross section or at least a partial cross section of the interior, higher stability of the profiled sleeve and also of the connection with the inner shaft can be produced. For example, a projection extended through a radial opening can be supported in the axial direction against the cup base. Furthermore, the interior can be closed by the cup base.

In an advantageous embodiment, the profiled sleeve is manufactured as a plastics injection molded part from a thermoplastic polymer. Good sliding properties can thereby be achieved if the inner and outer shaft are formed, for example, of steel or of an aluminum alloy.

For manufacture by plastics injection molding, it is advantageous that the injection point is arranged—preferably centrally—at the cup base. A radially extending flow front of the plastics melt can be formed over the cup base, which flow front runs in the axial direction first over the fastening portion and further over the bearing portion of the profiled sleeve. Uniform axial filling of the entire profiled sleeve thereby takes place without the formation of joint lines due to converging flow fronts.

According to the invention, a method for producing a profiled sleeve by plastics injection molding, in which molten plastics melt is injected through an injection channel at an injection point into a mold cavity of an injection mold which has an axially extended hollow profile space with an end-face end, provides that a disk-shaped, radially extended sprue space is arranged inside the hollow profile space at a distance from the end and at a radial distance, which sprue space is connected via at least one mold channel, which is directed axially towards the end contrary to the axial direction of the hollow profile, to a connecting space arranged at the end face, which connecting space is connected to the hollow profile space, wherein the polymer melt is injected in the axial direction centrally into the sprue space and is introduced axially into the hollow profile space via the mold channels and the connecting space.

The hollow profile space serves to form the bearing portion of the profiled sleeve. The profiled sleeve has—as described hereinbefore—a cup-shaped fastening portion which extends concavely from the end into the open cross section of the tubular bearing portion, wherein the disk-shaped cup base is at a distance from the end. The cup base is formed in the injection mold by the mentioned disk-shaped sprue space, which has a—preferably central—injection point. From the sprue space there extends coaxially towards the end at least one mold channel of tubular cross section, or a plurality of mold channels distributed over the circumference, by which the fastening portion is molded. This mold channel opens into an end-face connecting space, from which a further tubular mold cavity extends back in the opposite direction in the direction towards the sprue space, which further mold cavity surrounds the mentioned mold cavity that delimits the fastening portion coaxially at a radial distance and in which the bearing portion is molded.

An advantageous embodiment provides that the plastics melt is backed up in the sprue space and/or the connecting space before it enters the hollow profile space. For this purpose it is provided that the sprue space has a larger inner cross section than the mold channel or channels. The plastics melt can thus first back up in the sprue space as it is injected in and then flow at the end face with a uniform axial flow front into the mold channel or channels and into the following connecting space, in which the connecting portion is molded. Through the mold channels connected at the end face to the hollow profile space, a flow front, which is preferably closed over the circumference, is then able to spread out in the axial direction over the entire hollow profile space, until the space is completely filled. It is advantageous thereby that undesirable joint lines in the bearing portion molded in the hollow profile space can be avoided.

The profiled sleeve for the steering shaft according to the apparatus according to the invention is preferably produced by the method according to the invention.

FIG. 1 shows a length-adjustable steering shaft 1 which extends along an axis L (longitudinal axis) and has an inner shaft 2 and an outer shaft 3. The outer shaft 3 has at its outer end, which is on the right in the drawing, an attachment portion 31 for rotationally fixed connection to a vehicle steering system, not shown, for example to a steering spindle of a steering column. For example, a clampable fork can be used for this purpose. On its side facing the inner shaft 2, the outer shaft 3 is configured as a hollow shaft, which has in its opening 32 that is open towards the inner shaft 2 (see FIG. 2) an internal toothing with radially inwardly protruding teeth extended in the longitudinal direction. The teeth are formed in the outer shaft 3 by deformations introduced into the outer shaft 3 from the outside.

The inner shaft 2 has at its outer end remote from the outer shaft 3 an attachment portion 21, for example a fork for rotationally fixed connection to a further shaft of a vehicle steering system, not shown. The fork forms part of a universal joint, not shown.

At its end region facing the outer shaft 3, the inner shaft 2 has a toothing portion 22 which has an external toothing with teeth extended in the longitudinal direction, which can be seen in FIGS. 2, 3, 4 and 5. The toothing portion 22 preferably extends over a portion of the inner shaft 2. A profiled sleeve 4 according to the invention is fitted on the toothing portion 22. With a bearing portion 41, the profiled sleeve 4 encloses an end region of the toothing portion 22 from the outside, wherein the wall of the bearing portion 41 follows the contour of the teeth in cross section, that is to say is configured so as to correspond to the toothing profile of the toothing portion 22.

Figure 2:
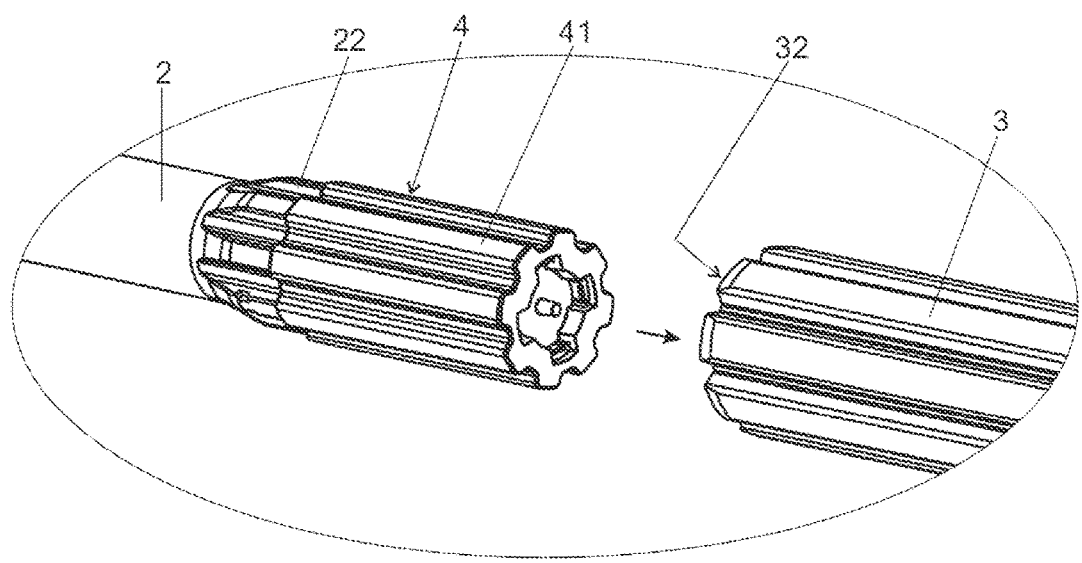
FIG. 2 is an exploded detail view of the steering shaft from FIG. 1.

With the toothing portion 22 and the profiled sleeve 4 fitted thereon, the inner shaft 2, for assembly, is inserted axially into the opening 32 of the outer shaft 3, as indicated in FIG. 2 by the arrow. In the inserted state, the toothing portion 22 engages with the profiled sleeve 4 fitted thereon into the internal toothing of the outer shaft 3 in a rotationally fixed manner, wherein the bearing portion 41 is located between the toothing portion 22 and the internal toothing. The inner shaft 2 and the outer shaft 3 are thus rotationally fixed for the transmission of torque but axially movable between the attachment portions 21 and 31 for length adjustment, as indicated in FIG. 1 by the double arrow.

The inner shaft 2 and the outer shaft 3 are usually manufactured from steel, and the profiled sleeve 4 is usually manufactured from a plastics material, preferably from a thermoplastic polymer by the injection molding method, so that a smooth sliding bearing of the adjustment in the longitudinal direction is produced by the bearing portion 41.

It is, however, also conceivable and possible to produce the inner shaft 2 and/or the outer shaft 3 from an aluminum alloy.

Figure 3:
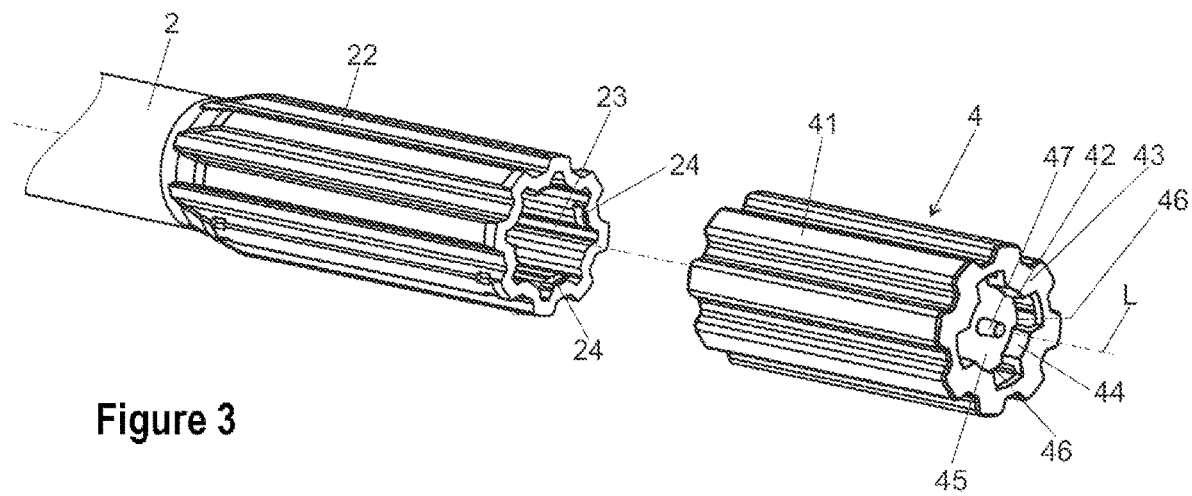
FIG. 3 is an exploded view of an inner shaft of the steering shaft according to FIGS. 1 and 2 and a profiled sleeve.
Figure 4:
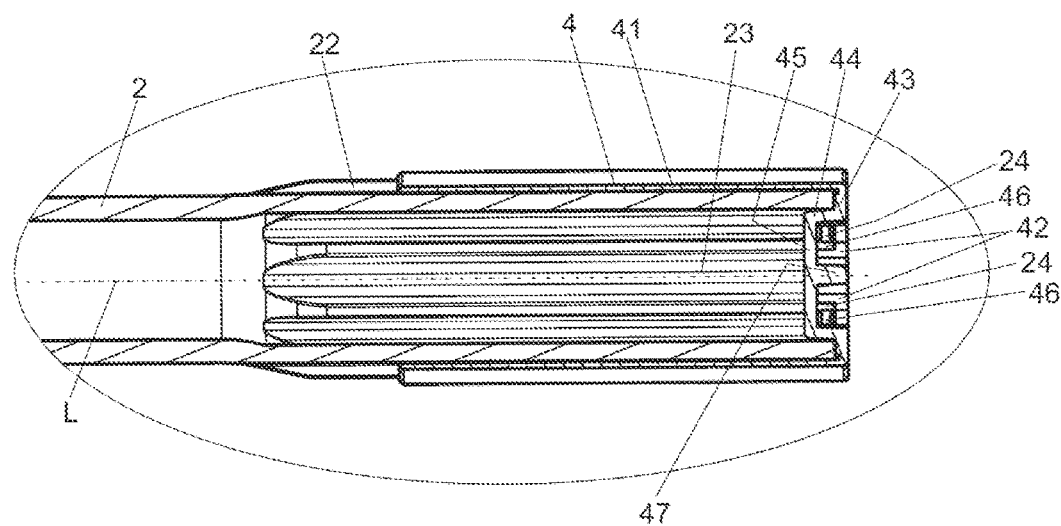
FIG. 4 is a longitudinal sectional view through an inner shaft according to FIGS. 2 and 3 in an assembled state.
Figure 5:
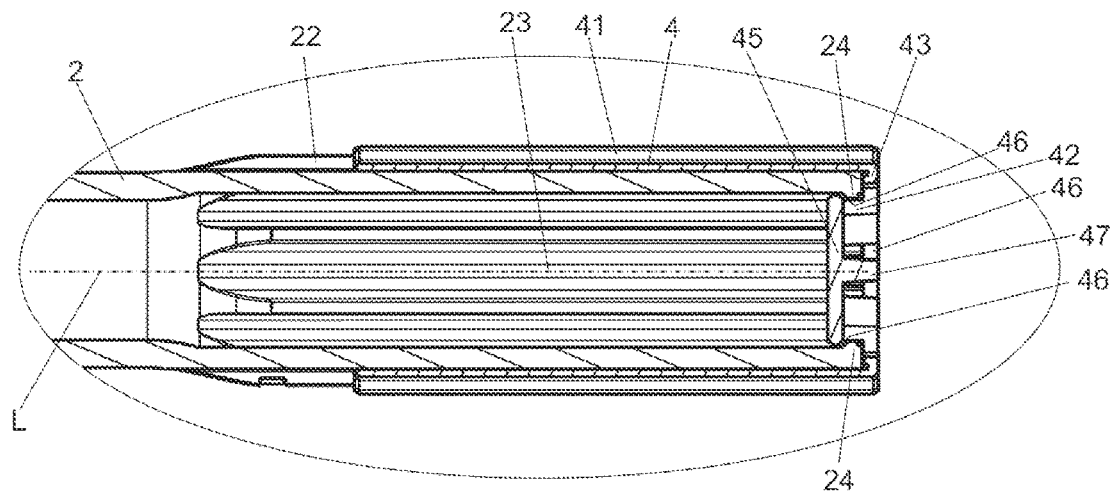
FIG. 5 is a longitudinal sectional view of an example shaft in a second angular orientation.

FIG. 3 shows the profiled sleeve 4 separated from the inner shaft 2. FIGS. 4 and 5 show the toothing portion 22 with the profiled sleeve 4 fixed thereto in different orientations with respect to the axis L.

The inner shaft 2 is configured as a hollow shaft in the region of the toothing portion 22, with an interior 23 which is open at the end and in the assembled state has an opening which is open towards the outer shaft 3.

It can be seen from the sections shown in FIGS. 4 and 5, which depict the assembled state of FIG. 2, that the bearing portion 41, lying against the outside, extends over the toothing portion 22. The profiled sleeve 4 has according to the invention a fastening portion 42, which is inserted through the end-face axial opening into the interior 23 of the inner shaft 2. The fastening portion 42 is connected to the bearing portion 41 via an end-face connecting portion 43.

In the embodiment shown, the fastening portion 42 is cup-shaped and has a tube portion 44 and a cup base 45. The tube portion 44 extends through the end-face opening along the inner wall into the interior 23, wherein the disk-shaped cup base 45 is located in the interior 23 at a distance from the end. The end region of the wall, having the toothing portion 22, of the inner shaft 2, which in this region is hollow, is located radially between the fastening portion 42 and the bearing portion 41. The fastening portion 42 engages around the end of the inner shaft 2.

The fastening portion 42 has on its outer circumference radial recesses 46, which can be in the form of openings in the tube portion 44. The inner shaft 2 has projections 24 protruding radially inwards into the interior. The projections 24 engage in a form-fitting manner into the radial recesses 46, so that a form-fitting connection that is effective in the axial direction is produced in that the projections 24 cooperate in a form-fitting manner in the axial direction, that is to say in the direction of the longitudinal axis L, with the base portion 45 and are in engagement therewith. Preferably a plurality of projections 24 and corresponding recesses 46—in the example shown four—are arranged distributed over the circumference, preferably arranged distributed uniformly over the circumference. Preferably two or three or four recesses 46 are provided, and projections 24 are provided in a correspondingly equal number matching the number of recesses 46.

The projections 24 can be in the form of plastic caulkings which can be cold formed into the end-face edge of the interior 23. The form of the projections 24 and the engagement into the recesses 46 can be seen particularly clearly in FIG. 5, which shows a section through form-fitting connections lying in the sectional plane.

The form-fitting connections formed in the interior 23 by the projections 24 and the recesses 46 effect a secure form-fitting connection of the profiled sleeve 4 to the inner shaft 2. It is advantageous thereby that there are no connecting means on the outside of the inner shaft 2, so that the bearing portion 41 can be made relatively longer and cannot be impaired by the fastening.

Figure 9:
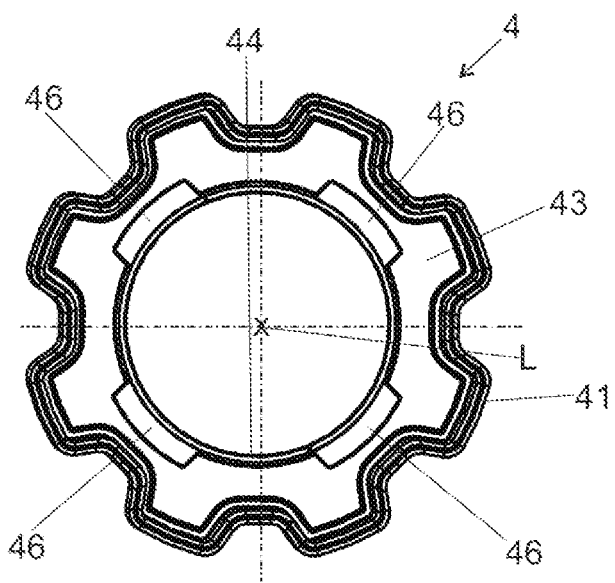
FIG. 9 is an axial view of an example profiled sleeve.
Figure 10:
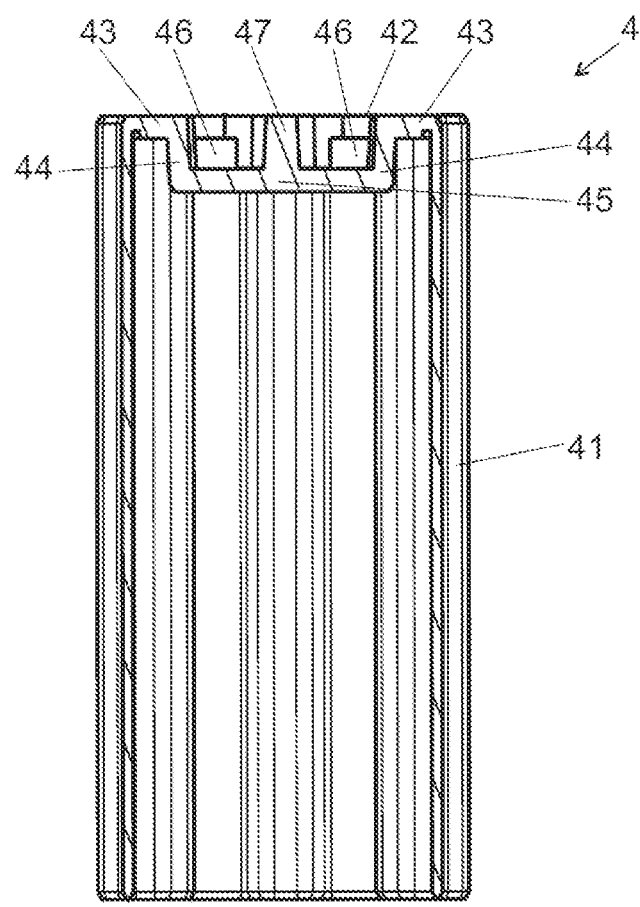
FIG. 10 is a longitudinal sectional view through the profiled sleeve of FIG. 9.

A profiled sleeve 4 according to the invention is shown separately in an axial view in FIG. 9 and in longitudinal section in FIG. 10. The cup-shaped fastening portion 42 with the tube portion 44 and the radial recesses 46 formed therein as openings are clearly visible therein. The recesses 46 can, as shown, preferably adjoin the cup base 45. As a result, the projections 24 can be supported axially against the cup base 45 in the assembled state and provide the form-fitting connection between the inner shaft 2 and the profiled sleeve 4.

A sprue 47 is located centrally on the cup base 45.

Figure 8:
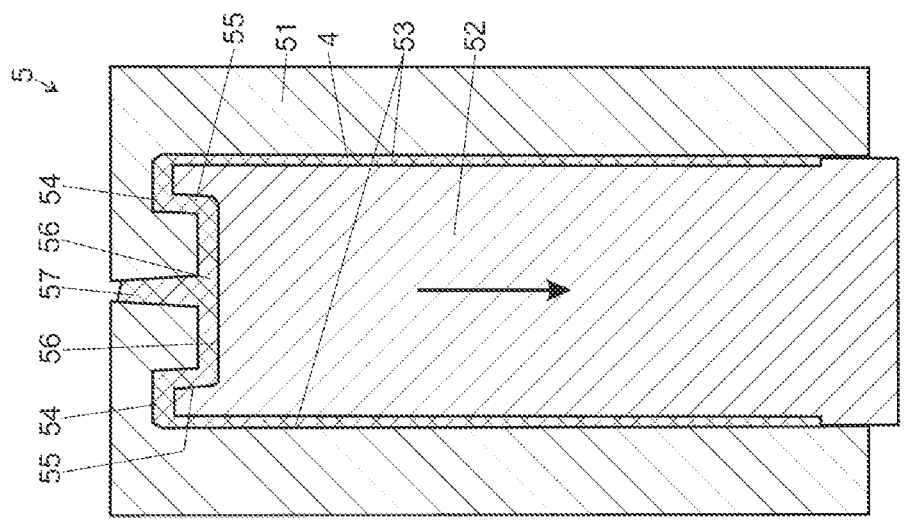
FIG. 8 is a sectional view of the injection mold according to FIG. 7 in a further phase at an end of the injection molding operation.
Figure 7:
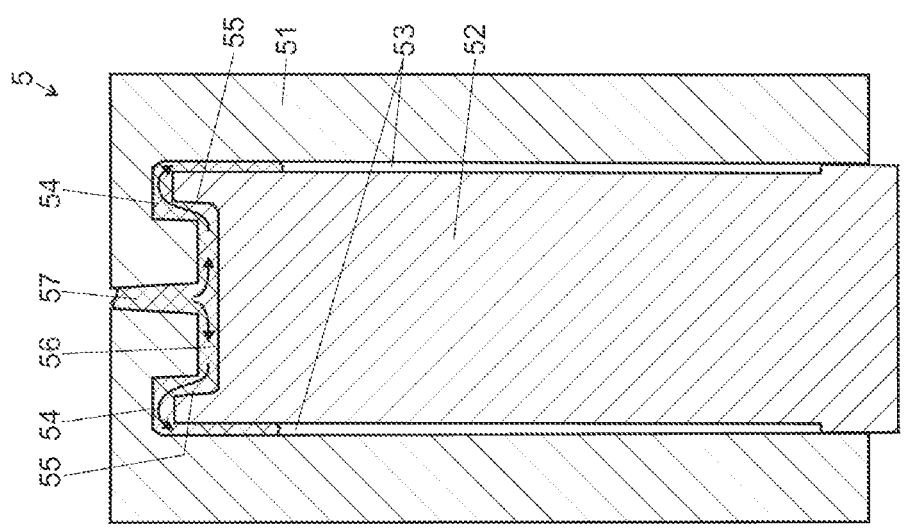
FIG. 7 is a sectional view of the injection mold according to FIG. 6 in a second phase of the injection molding operation.
Figure 6:
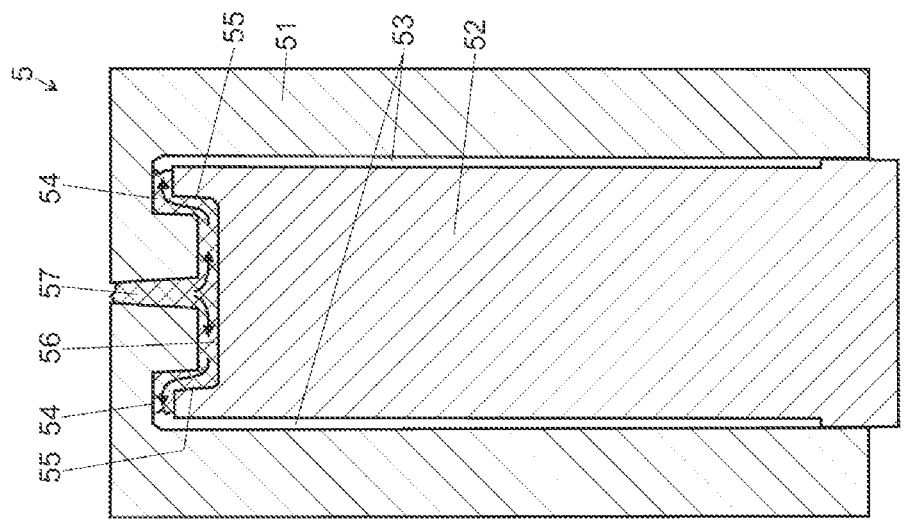
FIG. 6 is a sectional view of an example injection mold for producing a profiled sleeve in a first phase at a start of an injection molding operation.

The manufacture of a profiled sleeve 4 by the method according to the invention is shown schematically in FIGS. 6, 7 and 8, which show an injection mold 5 schematically in section in successive filling states. Between an outer mold 51 and a core 52 there is formed a mold cavity, which comprises a hollow profile space 53 for the bearing portion 21, which is connected to a connecting space 54 for molding the connecting portion 43. Mold channels 55 are thus connected at the end face, which mold channels delimit the tube portion 44. The mold channels 55 start from a sprue space 56, which is located inside the hollow profile space 53 and delimits the disk-shaped cup base 45. A sprue channel 57 opens centrally into the sprue space 56 from outside, through which sprue channel the molten plastics material is injected in a central sprue point.

The plastics melt is shown by crosshatching. At the start of the injection operation, the plastics material—as shown in FIG. 6—is injected via the sprue channel 57 centrally into the sprue space 56 and spreads radially outwards therein in all directions, as indicated by the arrows. From there, the plastics melt enters the mold channels 55 and, from there, the connecting space 54. As soon as the connecting space 54 is full, the flow front, which is closed over the circumference, moves in the axial direction into the hollow profile space 53, as is shown in FIG. 7, until this is completely full, as shown in FIG. 8. The core 52 can then be withdrawn axially from the outer mold 51 in the direction indicated by the arrow and, when the plastics melt has solidified, the finished profiled sleeve 4 can be removed.

Because the sprue space 55 has a flow cross section which is larger than that of the mold channels 54, and in particular is larger than the cross section of the hollow profile space 53, the plastics melt is backed up as it is injected, and it is ensured that a flow front that is closed in the circumferential direction forms, which effects uniform axial filling of the hollow profile space 53 without undesirable joint lines.

LIST OF REFERENCE SIGNS 1 steering column
2 inner shaft
21 attachment portion
22 toothing portion
23 interior
24 projections
24 projections
3 outer shaft
31 attachment portion
32 opening
4 profiled sleeve
41 bearing portion
42 fastening portion
43 connecting portion
44 tube portion
45 cup base
46 recesses
47 sprue
5 injection mold
51 outer mold
52 core
53 hollow profile space
54 connecting space
55 mold channels
56 sprue space
57 sprue channel
L axis (longitudinal axis)

What is claimed is:

1. A length-adjustable steering shaft for a motor vehicle, comprising:
    a hollow outer shaft with an unround inner cross section;
    an inner shaft that is received in a torque-locked and axially movable manner in the hollow outer shaft; and
    a profiled sleeve disposed between the inner shaft and the outer shaft, the profiled sleeve having a fastening portion that is connected to the inner shaft, wherein the inner shaft is configured at least in part as a hollow shaft that has an interior that is open towards an end that is inserted into the hollow outer shaft, wherein the fastening portion extends from the end into the interior of the inner shaft and is connected to an inner surface of the interior.

2. The length-adjustable steering shaft of claim 1 wherein the fastening portion has a radial outer surface that is connected to an inner surface that radially delimits the interior.

3. The length-adjustable steering shaft of claim 1 wherein the fastening portion is tubular.

4. The length-adjustable steering shaft of claim 1 comprising mutually corresponding connecting elements that are connected to one another and are disposed on the inner surface and on the fastening portion.

5. The length-adjustable steering shaft of claim 1 comprising a form-fitting element disposed on the inner shaft, the form-fitting element protruding radially inwards from the inner surface of the interior, wherein the form-fitting element is configured to be brought into form-fitting engagement with a form-fitting receiver of the fastening portion.

6. The length-adjustable steering shaft of claim 5 wherein the form-fitting element is caulking.

7. The length-adjustable steering shaft of claim 1 wherein the fastening portion is cup-shaped, with a cup base disposed axially spaced apart from an end face of the inner shaft.

8. The length-adjustable steering shaft of claim 1 wherein the profiled sleeve is comprised of plastic.

* * * * *